Figures 1, 2:
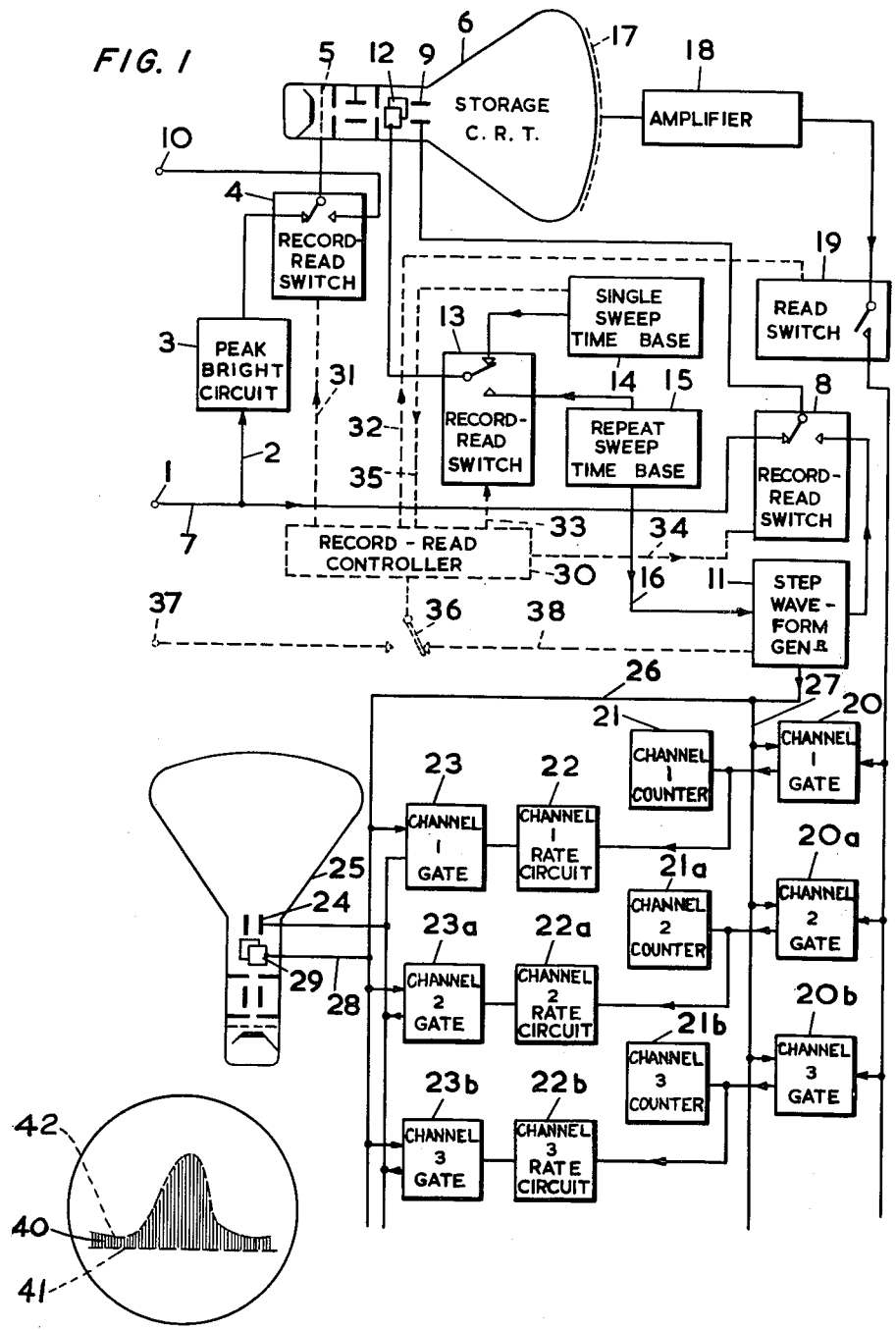

May 15, 1956  I. A. D. LEWIS  2,745,985
PULSE AMPLITUDE ANALYSERS
Filed Oct. 12, 1951

Inventor
IAN ALEXANDER DARROCH LEWIS,
By
Robert B Pearson
Attorney

United States Patent Office 2,745,985
Patented May 15, 1956

2,745,985

PULSE AMPLITUDE ANALYSERS

Ian Alexander Darroch Lewis, Wantage, Berkshire, England

Application October 12, 1951, Serial No. 251,105

5 Claims. (Cl. 315—9)

The invention relates to electrical pulse amplitude analysers for the amplitude classification of the pulses of an input pulse train into channels of predetermined amplitude ranges.

The pulse analyser of the invention may be arranged to accept input pulses having a separation between adjacent pulses of the order of one microsecond whilst providing a large number of channels of classification (of the order of 50) with an economical use of circuit components.

In its broadest aspect the pulse analyser of the invention comprises means for plotting the peaks of pulses of an input pulse train on time/amplitude co-ordinates as localised charged areas on a surface and means for scanning the plots in a series of channels each of constant amplitude range.

In one form of the invention the peaks of the input pulses are plotted as localised charged areas on a screen in a cathode-ray tube, the charged areas being established by a narrow electron beam intensified at the peak of each input pulse, the beam being deflected along one axis by a time base sweep and along the other axis by the input pulses according to their amplitude. The intensified electron beam, on impinging on the screen of the cathode-ray tube, plots a localised positively charged area as a result of loss of secondary electrons from the screen. This charged area tends to remain localised for a substantial period (e. g. about one fifth of a second). The analysis of the plots may be carried out, after disconnection of the sources of input pulses, by intensifying and defocussing the beam of the cathode-ray tube, deflecting the beam by a series of time base strokes, each of constant "vertical" deflection but stepped at the end of each stroke to an adjacent "vertical" level, and providing a pick-up plate near the screen to generate an output pulse each time a charged area is swept by the intensified beam. It is also arranged that, at each step of the time base stroke, gate circuits are operated to direct the output pulses from the pick-up plate into the relative amplitude classification channel which may comprise a scaling circuit or ratemeter circuit.

In the course of analysing the charged areas the intensified beam erases the originally charged areas on sweeping over them and hence prepares the apparatus for the receipt of further input pulses.

A storage system in which digits are represented by a charge pattern on the screen of a cathode-ray tube and a system for "reading" the charge pattern comprising a pick-up plate is described in a paper by Professor F. C. Williams and T. Kilburn in Proc. I. E. E., vol. 96, pt. III, pages 81–98. The combination of cathode-ray tube and pick-up plate is referred to as a "storage cathode-ray tube."

In one specific application of apparatus according to the invention, the peaks of pulses generated by a reaction in a frequency-modulated cyclotron are plotted for a period of 100 micro-seconds and then switched off for one milli-second whilst analysis takes place. For the plotting, a storage cathode-ray tube is blacked out and a 100 microsecond linear line base is applied to the X-plates, the input pulses are fed to the Y-plates and also to the grid of the cathode-ray tube through a brightening or intensifying circuit which is arranged to intensify the electron beam of the tube when the input pulses reach their maximum amplitude. A series of plots are obtained on the screen of the tube at heights corresponding to the amplitude of the input pulses. For the analysis, the source of input pulses is gated off, the tube brilliance is brought up to a constant level and the beam is defocussed by an amount dependent upon the required width of the channels of analysis. A twenty micro-second repetition time base is switched on and the beam of the tube is deflected vertically, in fifty steps each step occurring at the end of each time base stroke. The pattern of plots formed by the peaks of the input pulses is thus scanned by 50 horizontal deflections of the intensified beam at successive heights and an output pulse appears at the pick-up electrode each time the beam sweeps over one of the plots. Gate circuits are operated by the voltage used to step the beam vertically and amplified output pulses are fed through the gate circuits to the appropriate detectors such as scaling circuits, counters or rate circuits. In this arrangement of the apparatus about 10% of the time is spent in plotting the peaks of the input pulses and about 90% in analysing the plots. This is not disadvantageous when the source of input pulses is itself pulsed with an "off" period of 90% or more.

Where it is desired to increase the plotting time relative to the analysis time a system of interlacing may be adopted in which a plotting time base stroke and one or more analysis time base strokes occur alternately, the analysis strokes occurring at successive heights.

At high input pulse rates, ratemeter circuits may be used in each channel of the analyser and the outputs from these may be fed, via gates, to the Y-plates of a cathode-ray tube and the stepped voltage of the successive time-base sweeps applied to the X-plates so that amplitude distribution is shown visually.

The invention is applicable to the analysis of any effect which can give rise to an electrical impulse of amplitude related to the effect. For example, it may be used for the analysis of time intervals between events by generating a pulse of amplitude proportional to the time interval.

An embodiment of the invention is now described with reference to the accompanying drawing wherein Fig. 1 is a block-schematic circuit arrangement.

Fig. 2 shows a typical trace recorded on the rate display tube of Fig. 1.

The input to the circuit is at terminal 1. A connection 2 is taken from the terminal 1 through a peak brightening circuit 3 and electronic switch 4 to the grid 5 of a storage cathode-ray tube 6 and a connection 7 is also taken from the terminal 1 through an electronic switch 8 to the Y-plates 9 of tube 6. The switch 4 allows for connection to the grid 5 either of pulses from circuit 3 coincident with the peaks of the pulses of the input train or the connection of a fixed voltage from terminal 10. The switch 8 allows for either the connection of the input pulse train to the Y-plates of the tube 6 or the connection of a step wave-form generator 11 to the Y-plates of the tube 6. The X-plates 12 are connected via an electronic switch 13 to either a single-sweep time base circuit 14 or to a repetitive sweep time base circuit 15. The circuit 15 is associated with the generator 11 by connection 16.

The storage cathode-ray tube 6 has a charge pick-up plate 17 and a connection from this includes an amplifier 18 and switch 19 feeding the detector portion of the analyser. The detector portion comprises a series of detector channels each consisting of a gate circuit 20, 20a etc., a counter 21, 21a etc., a rate circuit 22, 22a etc., a gate circuit 23, 23a etc., and a connection to the Y-plates 24 of a rate display cathode-ray tube 25. Connections 26, 27 are taken from the step wave-form generator 11 to control the gates 20, 20a etc., and 23, 23a etc., and a connection 28 is taken from the generator 11 to the X-plates 29 of tube 25.

The control portion of the analyser, which is shown by the dotted lines, comprises a controller 30 with control connections 31, 32, 33, 34 to the switches 4, 19, 13 and 8 respectively. A connection 35 is made between time base circuit 14 and the controller and a switch 36 allows for the controller to be operated under the influence of external means applied at terminal 37 or automatically by conditions in the step wave-form generator 11 through connection 38.

The operation of the circuit is now described. The switches in the circuit as shown in the drawing are in a position for recording. Switch 36 is in a position for automatic operation.

An input pulse train connected at terminal 1 is fed via circuit 3 and switch 4 to the grid 5 of tube 6 so that the beam of the tube is intensified at the peaks of the pulses in the train. The single-sweep time-base circuit 14 coupled via switch 13 to the X-plates 12 of the tube 6 deflects the beam of the tube along the X-axis. The input pulse train is also connected to the Y-plates 9 of tube 6 via switch 8 so that the beam is deflected along the Y-axis. The degree of intensification of the beam by the peaks of the pulses is adequate to cause a "recording" to be made in the screen of the tube. This "recording," consisting of locally charged areas caused by the emission of electrons where the screen is hit by the intensified beam, provides a plot of the peaks of the pulses on time/amplitude co-ordinates. At the end of the time-base sweep from circuit 14 as signal is transmitted via connection 35 to change the controller from the "Record" to the "Read" position. This causes the operation of switches 4, 19, 13 and 8 so that a constant voltage is applied to the grid 5 of tube 6 to intensify the beam, the pick-up plate 17 is connected via switch 19 to the gates 20, 20a etc., the repeat-sweep time base circuit 15 is connected to the X-plates 12 of the tube 6 and the step wave-form generator 11 is connected to the Y-plates 9 of the tube 6. For operation in the "Read" position the screen of the tube is scanned in a series of adjacent time base sweeps each at a different level by the combined effect of the time-base circuit 15 and the step waveform generator 11. Pulses occur on the pick-up plate 17 as each plot made in the course of the recording operation is scanned. These pulses are amplified in the amplifier 18 and are fed to gate circuits 20, 20a etc., each gate being opened in turn by the step wave generator 11 via connection 27 so that each channel receives pulses associated with a particular time base sweep from the circuit 15, that is each channel receives pulses representing pulses of the input pulse train that lie in a particular narrow amplitude range. The pulses going into each channel are counted by a counter such as counter 21. The pulses in each channel are also fed to a rate circuit such as circuit 22 which produces an output signal proportional to pulse rate fed to the circuit. This output signal is connected via a gate circuit, such as circuit 23, which is opened by the generator 11 via connection 26 and thence to the Y-plates 24 of tube 25. The generator 11 also feeds signals via connection 28 to the X-plates 29 of tube 25 so that the beam of the tube is moved in steps and at each step the channel number is indicated by X-plate deflection of the beam and the pulse rate in that channel is indicated by the Y-plate deflection of the beam so that a specimen of pulse rate for the input pulse train is displayed. At the end of the "Read" operation the generator 11 transmits a signal along connection 38 and switch 36 to change the controller 30 to the "Record" position.

The rate display cathode ray tube trace shown in Fig. 2 consists of a series of vertical traces 40 rising from a base line 41. The traces 40 define an envelope 42 which is, in effect, a plot of pulse rate as ordinate against pulse amplitude as abscissa.

I claim:

1. A pulse amplitude analyzer comprising, a storage cathode-ray tube, circuit means connected to said tube for plotting the peaks of an input pulse train on time/amplitude co-ordinates as localized charged areas on the screen of said tiube, means for scanning said areas in a series of channels, each of constant amplitude range, and an analyzing circuit connected to said scanning means for analyzing the pulses scanned in each constant amplitude range.

2. A pulse amplitude analyzer comprising, a storage cathode ray tube, a recording circuit including pulse amplitude deflection and peak brightening means, whereby the peaks of an input pulse train are plotted on the screen of said tube as locally charged areas displaced with reference to time/amplitude co-ordinates, a reading circuit including means for scanning said areas in a series of channels, each of constant amplitude, and means for switching from said recording circuit to said reading circuit.

3. A pulse analyser comprising a cathode-ray tube having means for generating therein a narrow electron beam, means for deflecting the beam in one direction according to the amplitude pulses of an input pulse train, a single sweep base circuit for deflecting the beam in a complementary direction, means for intensifying the beam at the peaks of the input pulses to leave localised charge areas on the screen of the tube and means for analysing said charged areas comprising a charge pick-up plate associated with the screen, means for intensifying and widening the beam, a step-wave generator and repetitive time base circuit to deflect the intensified and widened beam in a series of adjacent sweeps corresponding to amplitude levels so that a pulse is produced on the pick-up plate whenever one of the said charged areas is scanned and gate circuits opened and closed in sequence for each sweep of the beam so that charges on the pick-up plate are fed to operate detectors associated with each gate circuit and change-over switch means for changing between the two functions of recording and analysis.

4. A pulse analyser according to claim 3 wherein the said detector comprises rate circuits the output of which are coupled to one set of deflection plates of a second cathode-ray tube via gate circuits opened and closed under control of said step-wave generator and the other set of deflection plates are connected to deflect the beam of that tube under the control of the output of the step-wave generator so that a spectrum of pulse amplitude of the input pulse train is displayed.

5. A pulse analyser according to claim 3 wherein said switch means is moved between its two positions of operation under alternate control of said single sweep time base circuit and selected one of the step outputs from said step-wave generator.

References Cited in the file of this patent

UNITED STATES PATENTS

| | | |
|---|---|---|
| 2,454,652 | Jams et al. | Nov. 23, 1948 |
| 2,465,355 | Cook | Mar. 29, 1949 |
| 2,524,296 | Mesner | Oct. 3, 1950 |
| 2,548,789 | Hergenrother | Apr. 10, 1951 |
| 2,577,758 | Hastings | Dec. 11, 1951 |
| 2,700,151 | Flory | Jan. 18, 1955 |